US009845885B2

(12) United States Patent
Stephenson et al.

(10) Patent No.: US 9,845,885 B2
(45) Date of Patent: Dec. 19, 2017

(54) MECHANICAL SEAL SUPPORT SYSTEM

(71) Applicants: Heath Stephenson, Rotherham (GB);
John Smiddy, Rotherham (GB); Paul
Harte, Rotherham (GB)

(72) Inventors: Heath Stephenson, Rotherham (GB);
John Smiddy, Rotherham (GB); Paul
Harte, Rotherham (GB)

(73) Assignee: AES Engineering Ltd., Rotherham
(GB)

(*) Notice: Subject to any disclaimer, the term of this
patent is extended or adjusted under 35
U.S.C. 154(b) by 0 days.

(21) Appl. No.: 14/934,811

(22) Filed: Nov. 6, 2015

(65) Prior Publication Data

US 2016/0131261 A1 May 12, 2016

(30) Foreign Application Priority Data

Nov. 6, 2014 (GB) .................................. 1419795.8

(51) Int. Cl.
F16J 15/34 (2006.01)
F16K 21/04 (2006.01)

(52) U.S. Cl.
CPC .......... *F16J 15/3404* (2013.01); *F16K 21/04* (2013.01)

(58) Field of Classification Search
CPC ........ F16J 15/3404; F16J 15/40; F16J 15/406;
F16J 15/004
See application file for complete search history.

(56) References Cited

U.S. PATENT DOCUMENTS

| 1,323,474 | A | * | 12/1919 | Hodgkinson | F16C 33/1075 277/347 |
| 2,965,398 | A | * | 12/1960 | Keller | F01D 11/04 277/304 |
| 3,937,022 | A | * | 2/1976 | Swearingen | F01D 11/04 277/432 |
| 4,170,440 | A | * | 10/1979 | Gusmer | B05B 7/0018 137/238 |
| 5,249,812 | A | * | 10/1993 | Volden | F16J 15/162 277/361 |
| 5,365,971 | A | * | 11/1994 | Bergamini | F16J 15/004 137/556 |
| 5,769,427 | A | * | 6/1998 | Ostrowski | F04D 29/128 277/318 |
| 6,070,880 | A | * | 6/2000 | McKeever | F16J 15/3404 277/304 |
| 6,116,609 | A | * | 9/2000 | Azibert | F16J 15/3488 277/388 |
| 7,497,229 | B2 | * | 3/2009 | Tahir | F04D 29/108 137/391 |
| 7,669,858 | B2 | * | 3/2010 | Tahir | F16J 15/002 277/318 |

(Continued)

FOREIGN PATENT DOCUMENTS

CN 2257746 Y * 7/1997

*Primary Examiner* — Eugene G Byrd
(74) *Attorney, Agent, or Firm* — Edwin D. Schindler

(57) ABSTRACT

A seal support system, for use in combination with a mechanical seal installed on a piece of rotating equipment, includes a pressure vessel, one or more fluid inlets and connecting pipework between the one or more fluid inlets and the mechanical seal. A device is included to alter the fluid flow, so that a portion of the seal support system may be isolated for various purposes, such as, for example, cleaning or repurposing.

17 Claims, 3 Drawing Sheets

(56) References Cited

U.S. PATENT DOCUMENTS

Figure 1:
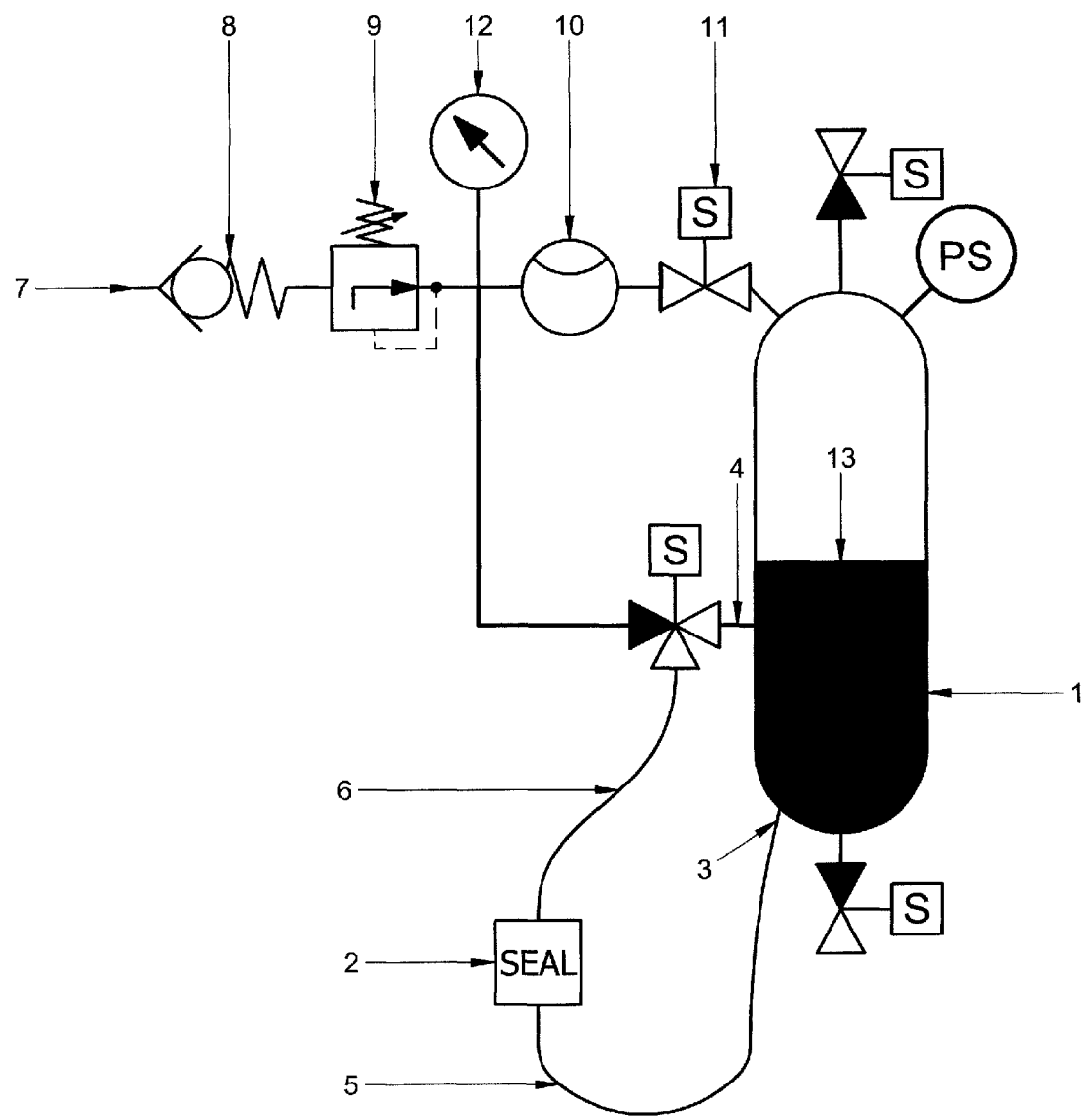

| | | | |
|---|---|---|---|
| 2003/0075870 A1* | 4/2003 | Meuter | F04D 7/06 |
| | | | 277/355 |
| 2003/0122323 A1* | 7/2003 | Tahir | F16J 15/3404 |
| | | | 277/630 |
| 2005/0184464 A1* | 8/2005 | Tahir | F16J 15/002 |
| | | | 277/348 |
| 2008/0233536 A1* | 9/2008 | Hasenzahl | A61C 13/12 |
| | | | 433/89 |
| 2010/0123055 A1* | 5/2010 | Roddis | F16J 15/406 |
| | | | 248/125.8 |

* cited by examiner

MECHANICAL SEAL SUPPORT SYSTEM

BACKGROUND OF THE INVENTION

Technical Field of the Invention

The present invention relates, generally, to seal support systems and, more particularly, to seal support systems which can be used with mechanical seals for the containment of process fluids in typically clean environments.

Description of the Prior Art

"Rotating equipment" is an industry term of art which covers a wide range of different machinery, including pumps. In nearly all forms of rotating equipment, some form of mechanical seal is used to ensure that product or contaminants do not migrate unintentionally. Within a pump, a mechanical seal is used to seal the pump product in the volute casing whilst allowing the shaft to rotate.

For a mechanical seal to allow rotation while sealing the volute casing, the mechanical seal has to create a sealed path between the casing and the shaft. This is achieved by using a rotary seal face, which is coupled to the shaft, and a stationary seal face, which is coupled to the housing. These two faces are manufactured with high tolerance flat faces and are energized together in order to create a seal. So as to ensure that the faces don't wear out, fluid is allowed to pass between the seal faces to reduce friction. This fluid typically escapes into the atmosphere as a vapor or, alternatively, is absorbed into the pumped product.

In many applications it is a requirement that a double mechanical seal be used, which includes an additional set of sealing faces thus creating an internal cavity. The purpose of this is so that a buffer or barrier fluid may be used to regulate the operating environment of the seal. Typically, these plans follow those that are laid out by the American Petroleum Institute and are referred to as API plans.

Two common plans that are used are "Plan 53a" and "Plan 62." Plan 62 is where a buffer/barrier fluid is piped directly into the internal cavity of a double mechanical seal and then out to drain and is sometimes referred to as a "flush-to-drain" system. This plan ensures that any product which passes across the seal faces is washed away, but does result in a very large expenditure in buffer/barrier fluid. Plan 53a utilizes a pressure vessel to provide a buffer/barrier fluid to the internal cavity of the seal and the thermosyphon effect to ensure cooler fluid is passing through the seal. Thermosyphon systems are significantly less expensive to run but they do have the downside of potentially harboring the build up of dirt and product.

In industry, where it is necessary to ensure that any build-up of product or dirt is avoided, it is common to use a "Clean In Place" procedure, otherwise known as CIP. This is where a spray ball is used to distribute a cleaning fluid to all product contacting surfaces within a vessel or system. CIP procedures are typically completed during shut down times, or when the machinery is not running, as they would otherwise impede or affect production.

In Plan 62, there is little need for CIP procedures, as the seal and the associated pipe work is inherently cleaned via the constantly running of buffer fluid.

In a Plan 53a procedure, it is known that a CIP procedure can negate the potential for product and dirt to build-up inside the pressure vessel and associated equipment. However, it is not possible to run the procedure during operation, as the vessel would need to be drained and thus would not be able to operate accordingly.

SUMMARY OF THE INVENTION in accordance with the present invention, there is provided a seal support system for use in conjunction with a mechanical seal installed on a piece of rotating equipment, which comprises a pressure vessel, a number of fluid inlets and connecting pipe work between the fluid inlets and the mechanical seal, such that it encompasses the pressure vessel and such equipment for allowing the fluid flow through the system to be altered.

Preferably, the flow of fluid from one or more of the fluid inlets may be directed independently to one or more sections of the system thereby enabling the potential to run one or more functions of the system separately and/or in parallel. This would allow for the system to be able to maintain functionality whilst completing additional procedures set up to ensure continued clean running of the associated equipment.

Preferably, the flow of fluid from one or more of the fluid inlets flows, whether directly or indirectly, to, and passes through, the mechanical seal. Normal operation of the system would be to provide fluid to the mechanical seal so as to maintain an optimum running environment. Ideally, during additional operations it would be advantageous to be able to maintain the optimum running environment around the seal.

Preferably, there is provided such elements as to allow the method by which fluid is supplied to the mechanical seal to be altered as appropriate. Defining multiple methods to provide fluid to the mechanical seal allows for different aspects of the system of the present invention to be isolated or repurposed.

Preferably, there are multiple methods of operation defined as primary, secondary, and, but not limited to, tertiary. More than one method of operation allows for additional functions for the purposes of ensuring more effective operation of the overall system.

Preferably, one of the methods of operation allows for the operational state of the pressure vessel to be altered whilst allowing for the continued operation of said rotational equipment. Wherein, such states may include cleaning and draining cycles for the purposes of reducing and negating the build up of foreign contaminants and where such operations to the effect outlined above are run without the operation of said rotating equipment being affected.

Preferably, one of the methods of operation allows for specific aspects of the system to be made redundant to the continued operation of the rotational equipment. It is deemed advantageous to be able to remove the equipment, such as the pressure vessel, for detailed inspection, sterilization, refurbishment or other activities, as may be required.

Preferably, there is included, but not limited to, a primary and secondary method of operation which may be characterized in the primary case by a thermosyphon system and in the secondary case by a flush-to-drain system. Additional methods of operation may include routines which cover the draining and flushing of specific elements of the system, as well as different modes of operation to do with the running of the mechanical seal and/or system.

Preferably, such elements that are provided for the purpose of alternating between primary and secondary operation are defined as being capable of being controlled through non-manual means. Such elements would be able to be activated individually or in multiple permutations such that different operations could be performed and additionally the method by which said elements are controlled may include onsite and remote methods. Such non-manual means would include, but is not limited to; such methods as electrically actuated solenoid valves and pneumatically actuated valves.

Preferably, there is included in the system means by which the pressure may be determined and where such information may be used to inform control mechanisms. Wherein, the method by which the pressure is determined is defined as a pressure switch and, such that in certain operations, the increasing pressure may be used to trigger a change and therefore alter the current function of the system.

Preferably, there is provided as part of the system such elements as to allow for cleaning procedures to be carried out. Such cleaning procedures, as flushing and spraying of cleaning fluid through part or all of the system and wherein, may be included, distribution elements, such as but not limited to, spray balls.

Preferably, there is provided a method to drain excess fluid from the system, wherein the method of the present invention is utilized as part of specific functions of the system, such as cleaning operations.

Preferably, there is provided means for negating pressure build up when required, wherein the pressure vessel may be temporarily converted to a non-pressure retaining container as is required.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

Figure 2:
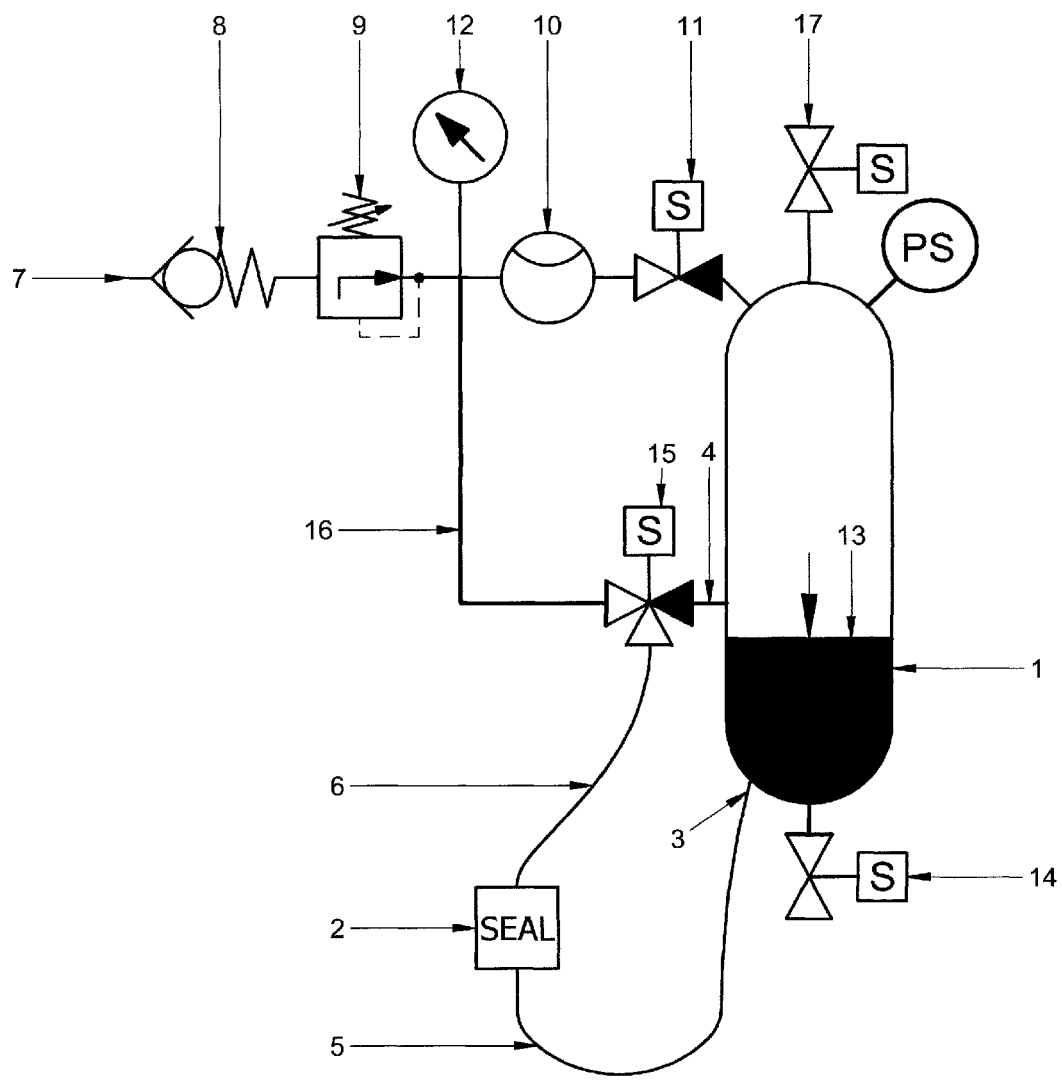
Figure 3:
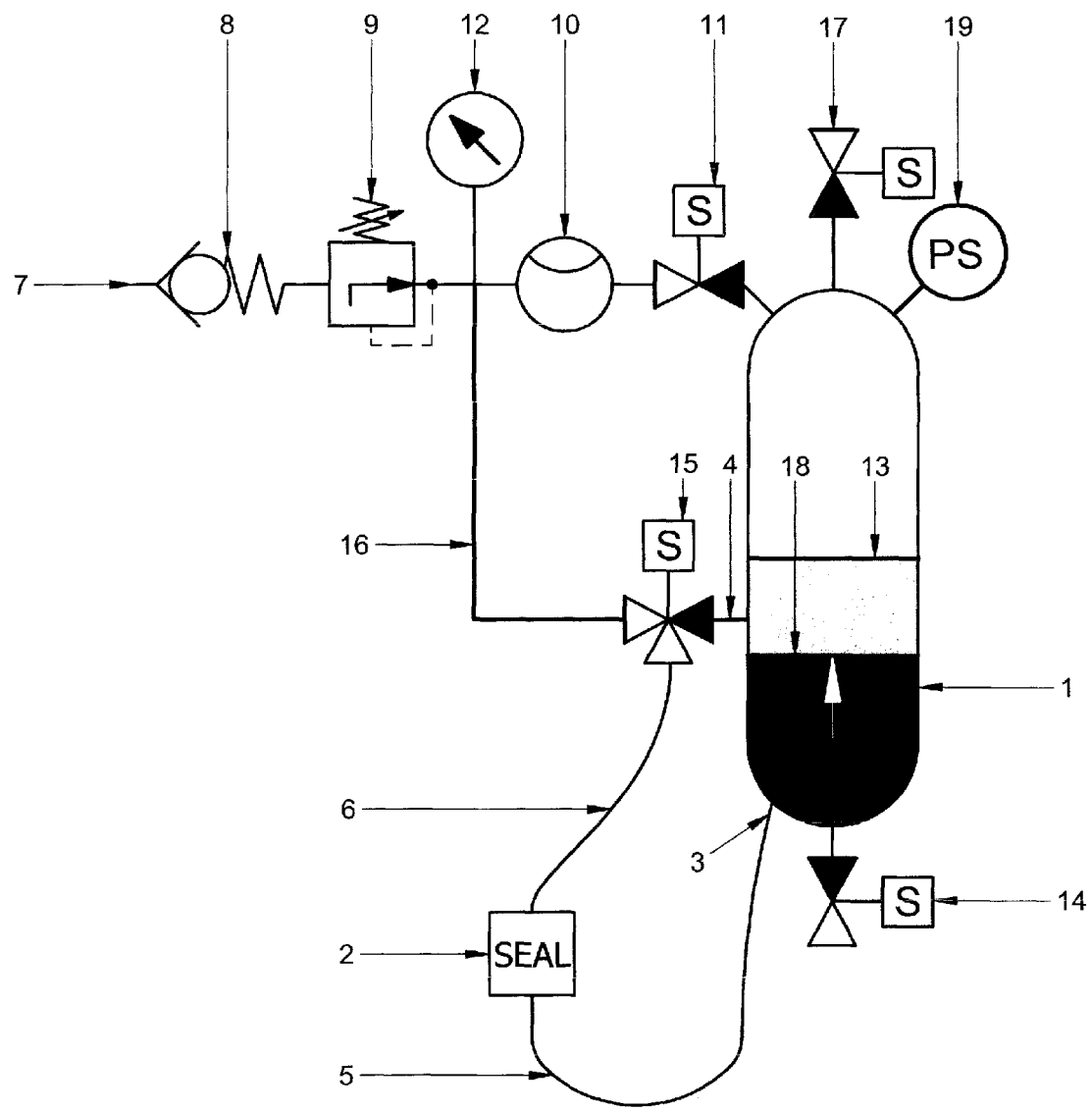

In the drawing, wherein similar reference numerals and symbols denote similar features throughout the several views:

FIG. 1 is a schematic diagram of the piping and instrumentation of a first preferred embodiment of the mechanical seal support system of the present invention, wherein the system is operated as a thermosyphon system;

FIG. 2 is a schematic diagram of the piping and instrumentation of a second, alternative preferred embodiment of the mechanical seal support system of the present invention, wherein the mechanical seal is run in a flush to drain set up and the pressure vessel is being cleaned; and, FIG. 3 is a schematic diagram of the piping and instrumentation of a third, alternative preferred embodiment of the mechanical seal support system of the present invention, wherein the mechanical seal is run in a flush to drain set up and the pressure vessel is being refilled.

DETAILED DESCRIPTION OF THE DRAWING FIGURES AND PREFERRED EMBODIMENTS

The invention will now be described, by way of example only, with reference to the accompanying drawings:

Referring to FIG. 1 of the accompanying drawings, there is shown a pressure vessel 1, which connects to a mechanical seal 2 through feed port 3 and return port 4 and, by feed pipe 5 and return pipe 6, such that a closed loop is formed between the mechanical seal 2 and the pressure vessel 1.

In one preferred method of operation, fluid enters through supply port 7 and passes through a non-return valve 8, a pressure regulator 9, a flow indicator 10, normally open solenoid fill valve 11 and, where is also included, a pressure gauge 12. As fluid enters the pressure vessel 1, it pressurizes the volume of gas present in the pressure vessel 1 and continues to fill up until the internal pressure is equal to the set point of the pressure regulator 9 and the final volume 13 has been reached. Once the pressure vessel 1 is pressurized, fluid begins to thermosyphon through the mechanical seal 2 via the seal feed and return pipes 5 and 6, respectively.

Referring to FIG. 2 of the accompanying drawings, there is shown the system of invention in an alternative, preferred operating state, such that normally open solenoid fill valve 11 is closed, and normally closed solenoid drain valve 14 is open, such that the fill volume 13 is emptied from pressure vessel 1. In conjunction with normally open solenoid fill valve 11 being closed, three-way solenoid valve 15 switches so as to change the connection of seal return pipe 6 from running to the pressure vessel 1 via return port 4 to direct feed line 16, thus diverting the fluid from supply port 7 directly to the mechanical seal 2 via the non-return valve 8, pressure regulator 9 and pressure gauge 12.

Once fluid enters the mechanical seal 2 via return pipe 6, it is passed back into the vessel via feed pipe 5, and through feed port 3, and onto drain via normally closed solenoid drain valve 14.

In this method of operation, the system of invention is capable of dispensing cleaning fluid to the internal space of the system via normally closed solenoid CIP valve 17, which is, in turn, drained through normally closed solenoid drain valve 14.

Referring to FIG. 3 of the accompanying drawings, there is shown the system of invention in a further alternative preferred operating state such that normally closed solenoid drain valve 14 and normally closed solenoid CIP valve 17 are in the closed position, and where fluid supplied through fluid inlet port 7 is passed into pressure vessel 1 via mechanical seal 2.

As rising fluid level 18 approached final fill volume 13, the pressure in pressure vessel 1 increases. Once the pressure is at the desired set point, pressure switch 19 activates and signals all solenoid valves back to their initial state.

While only several embodiments of the present invention have been shown and described, it will be obvious to those skilled in the art that many modifications may be made to the present invention without departing from the spirit and scope thereof.

What is claimed is:

1. A seal support system for use in combination with a mechanical seal installed on a piece of rotating equipment, comprising:
   a pressure vessel; and,
   a fluid inlet for connecting pipework between said fluid inlet and the mechanical seal, the connecting pipework including means for directing a flow of fluid from the fluid inlet to the mechanical seal via said pressure vessel and thereby passing through both the mechanical seal and said pressure vessel and, alternatively, able to direct the flow of fluid from the fluid inlet directly to the mechanical seal without passage through said pressure vessel, thereby enabling said pressure vessel to be isolated from the flow of fluid for permitting cleaning.

2. The seal support system for use in combination with a mechanical seal installed on a piece of rotating equipment according to claim 1, wherein said seal support system is a thermosyphon system.

3. The seal support system for use in combination with a mechanical seal installed on a piece of rotating equipment according to claim 1, wherein said seal support system is a flush-to-drain system.

4. The seal support system for use in combination with a mechanical seal installed on a piece of rotating equipment according to claim 1, wherein said seal support system is able to be changed from a thermosyphon system to a flush-to-drain system and back to said thermosyphon system.

5. The seal support system for use in combination with a mechanical seal installed on a piece of rotating equipment according to claim 1, further comprising cleaning elements for cleaning said seal support system.

6. The seal support system for use in combination with a mechanical seal installed on a piece of rotating equipment according to claim 5, wherein said cleaning elements for cleaning said seal support system include spray balls for distributing cleaning fluid to internal surfaces of said seal support system.

7. The seal support system for use in combination with a mechanical seal installed on a piece of rotating equipment according to claim 1, further comprising a pressure regulator for maintaining a predetermined pressure across the mechanical seal during operation of said seal support system.

8. The seal support system for use in combination with a mechanical seal installed on a piece of rotating equipment according to claim 1, further comprising a drain valve for draining excess fluid from said seal support system.

9. The seal support system for use in combination with a mechanical seal installed on a piece of rotating equipment according to claim 1, further comprising a pressure regulator for reducing pressure, as determined by fluid pressure and total volume of gas of said seal support system, as required.

10. A method for operating a seal support system for use in combination with a mechanical seal installed on a piece of rotating equipment, said seal support system comprising:
a pressure vessel; and,
a fluid inlet for connecting pipework between said fluid inlet and the mechanical seal, the connecting pipework encompassing said pressure vessel for allowing a flow of fluid through said seal support system, said method comprising the step of:
optionally capable of directing the flow of fluid from the fluid inlet to the mechanical seal via said pressure vessel and thereby passing through both the mechanical seal and said pressure vessel and, alternatively, able to direct the flow of fluid from the fluid inlet directly to the mechanical seal without passage through said pressure vessel for isolating said pressure vessel from the flow of fluid for permitting cleaning.

11. The seal support system for use in combination with a mechanical seal installed on a piece of rotating equipment according to claim 1, wherein means for directing a flow of fluid includes a three-way solenoid valve for changing a connection of the connecting pipework for the flow of fluid from allowing the flow of fluid to flow to said pressure vessel to a direct feed line for diverting the flow of fluid from said fluid inlet directly to the mechanical seal.

12. The seal support system for use in combination with a mechanical seal installed on a piece of rotating equipment according to claim 1, wherein means for directing a flow of fluid includes at least one pneumatically actuated valves for changing a connection of the connecting pipework for the flow of fluid from allowing the flow of fluid to flow to said pressure vessel to a direct feed line for diverting the flow of fluid from said fluid inlet directly to the mechanical seal.

13. The seal support system for use in combination with a mechanical seal installed on a piece of rotating equipment according to claim 1, further comprising a solenoid drain valve, wherein said connecting pipework for the mechanical seal includes a return pipe and a feed pipe, the flow of fluid being able to enter the mechanical seal via said return pipe and then being passed back into said pressure vessel via said feed pipe before being directed to a drain via said solenoid drain valve when said solenoid drain valve is closed.

14. The seal support system for use in combination with a mechanical seal installed on a piece of rotating equipment according to claim 1, further comprising a pressure regulator for setting a predetermined internal pressure for said pressure vessel, so that as fluid enters said pressure vessel and said pressure vessel is pressurized to the predetermined internal pressure and fluid being to thermosyphon through the mechanical seal.

15. The seal support system for use in combination with a mechanical seal installed on a piece of rotating equipment according to claim 1, wherein more than one said fluid inlet is provided for the connecting pipework and said means for directing the flow of fluid from said more than one fluid inlet provides multiple pathways for the flow of fluid to the mechanical seal.

16. The seal support system for use in combination with a mechanical seal installed on a piece of rotating equipment according to claim 15, wherein said multiple pathways for the flow of fluid to the mechanical seal are in parallel to one another.

17. The seal support system for use in combination with a mechanical seal installed on a piece of rotating equipment according to claim 15, wherein said multiple pathways for the flow of fluid to the mechanical seal are independently operable from one another.

* * * * *